United States Patent [19]

Jelenko, III

[11] 3,920,848

[45] Nov. 18, 1975

[54] TOPICAL AGENT FOR ALLEVIATION OF FULL THICKNESS BURNS IN MAMMALS

[76] Inventor: Carl Jelenko, III, 2205 Country Club Court, Augusta, Ga. 30904

[22] Filed: Jan. 10, 1974

[21] Appl. No.: 432,216

Related U.S. Application Data

[63] Continuation-in-part of Ser. No. 354,099, April 24, 1973.

[52] U.S. Cl. .......... 424/312; 424/DIG. 13; 424/314
[51] Int. Cl.² ......................................... A61K 27/00
[58] Field of Search.............. 424/DIG. 13, 312, 314

[56] References Cited
UNITED STATES PATENTS
3,676,472    7/1972    Zilliken et al................... 424/312 X OTHER PUBLICATIONS
*Ann. Surg.*, July, 1971, Vol. 174, No. 1, pp. 109–114

*Primary Examiner*—Frederick E. Waddell
*Attorney, Agent, or Firm*—John S. Roberts, Jr.

[57] ABSTRACT

A method embodying a new use for the known natural lipid ethyl linoleate [ethyl-cis, cis (9, 12)-octadecadienoate]. This compound in the presence of a related stabilizer such as ethyl linolenate [ethyl-cis, cis, cis (9, 12, 15)-octadecatrienoate] or an antioxidant such as propyl gallate, riboflavin, and ascorbic acid has previously been utilized in burn therapy to diminish water loss through the skin, but a critical limitation of use only after 12 hours post-burn was noted, it being thought that the time lag was probably due to time consumed in conjugation with protein in full thickness burns on the skin or full hydration of the full thickness burns. The present use of ethyl linoleate, both in animals and in human therapy, utilizes the compound preferably neat and uses the characteristic that burn relief from full thickness burns or third degree burns may be achieved immediately post-burn.

The compound is used in approximately the same effective quantities, e.g., 0.2–0.8 mg/cm² of burned area with an optimum value of 0.5 mg/cm² of burned area, and in humans it has been found advisable to repeat the dosage per diem until full therapeutic effect is realized.

5 Claims, No Drawings

TOPICAL AGENT FOR ALLEVIATION OF FULL THICKNESS BURNS IN MAMMALS

This invention is a continuation-in-part of pending patent application of Carl Jelenko, III, Ser. No. 354,099, filed Apr. 24, 1973, entitled "A Topical Agent for Control of Post-Burn Evaporative Water and Calorie Losses."

The present invention relates to compositions for relief of full thickness burns also known as third degree type burns and methods of topical treatment of the burned area as applied to humans and mammals having homeothermic skin. Specifically the present invention is related to a new use of a lipid naturally occurring in the skin. This lipid, ethyl linoleate [ethyl-cis, cis (9, 12)-octadecadienoate], has been previously described as noted above in the copending application by the same investigator as useful with a related stabilizer, ethyl linolenate for retarding water loss in post-burn therapy but with the limitation that the combination was ineffective until at least 12 hours post-burn. The present development utilizes ethyl linoleate preferably neat and there is no time lag limitation on the use of the topical application.

PRIOR ART

1. Carl Jelenko III, et al., "Studies in Burns. X. Ethyl Linoleate: The Water-Holding Lipid of Skin — A. The Evidence," Journal of Trauma, 12:968, 1972.

2. Carl Jelenko III, et al., "Studies in Burns. XI. Ethyl Linoleate: The Water-Holding Lipid of Skin — B. Effects on In Vivo Burn Eschar," Journal of Trauma, 12:974, 1972.

3. Gilbert B. Bradham, "Direct Measurement of Total Metabolism of a Burned Patient," Arch. Surg., 105:410, 1972.

4. Carl Jelenko III, et al., "Studies in Burns. XII. Evaporative Water Loss Is Related to Post-Burn Hypermetabolism," [accepted for publication by the Journal of Surgical Research].

The articles noted above, together with the Jelenko application acknowledged and described ante, constitute the prior art believed to be most pertinent and related to the present application.

The dosages recommended for the present neat utilization of ethyl linoleate are as a topical application, in an aerosol and in a concentrate a quantity of approximately 0.2–0.8 mg/cm$^2$ of burned area, with an optimum value of 0.5 mg/cm$^2$ of burned area. In humans a repeated dose of the same magnitude per diem has been indicated until full effectiveness is reached. Surprisingly enough, it has been found that the present application changes the kind and number of organisms in a burn wound. Although it is not an antiseptic, the application of ethyl linoleate preferably neat enables regeneration of tissue or healing in a significant number of subjects treated and to a degree significantly greater than in prior methods. This is especially true in third degree or full thickness burns. Although it is somewhat related to the previous problem of inducing water holding in post-burn therapy, the problems involved and the solutions are not co-existent as to time or therapeutic target. For example, the present development affirmatively lowers the mortality rate in otherwise lethal burns and also takes advantage of a recently discovered attribute of full thickness burns that there remains some active cell in the tissue and this has been shown to continue for at least 24 hours (cf. Journal of Southern Medical Association, Vol. 63, pages 1393–99, December 1970, in an article by Jelenko et al. entitled "Ion Selection by Burn Eschar." The author states at page 1398, "It has been demonstrated that considerable alteration in the hydrational status and water binding of the protein matrix of eschar occurs over the first 24 hours in burn wound." This phenomenon has also been shown by a biophysical measurement of the ability of the cell to transport sodium and potassium activity.

It has been found that the application of ethyl linoleate topically enables regeneration or healing in a significant portion of the subjects treated both in animal studies and higher mammals such as humans and further that the present treatment is significantly greater than that observed with other methods. This is particularly true with what has heretofore been termed a full thickness or third degree burn. It is noted that prior to 1950 this type of burn was considered to be an unalterably third degree burn and in about 1954 burn surfaces began to be treated with a variety of topical antibacterial agents. Some success was found due to the probable reason that the antibacterial material killed organisms which competed with the living cells in the surface for nutrients. It is postulated that the present treatment with the lipid ethyl linoleate changes the physical and chemical structure of the burned skin or the physical and chemical properties of the burned skin. It is known that after 12 hours the ethyl linoleate lowers the evaporated water loss and raises the temperature of the wound, and thus the wound is at that time in a more favorable temperature for cell life, but the effect immediately post-burn is more subtle and may be due to the changing chemical composition of the fluid bathing the cells which, as time goes on, is restored more to the normal.

In the experimental data below certain basic statistical criteria have been utilized which tend to show the factor of probability as compared with control for the results achieved. In the data, two criteria are noted. The $X^2$ (or Chi Square) is used to determine if a certain distribution differs from some predetermined theoretical distribution [Steel and Torrie, *Principles and Procedures of Statistics*, McGraw Hill, 1960, Chapter 19; and Downie and Heath, *Basic Statistical Methods*, 2d Ed., Harper and Row, 1965, page 161]. Also useful in the experimental data following is the Student's $t$, which is a deviation divided by standard deviation [Steel and Torrie, *Principles and Procedures of Statistics*, McGraw Hill, 1960, pages 62–63; and Downie and Heath, *Basic Statistical Methods*, 2d Ed., Harper and Row, 1965, pages 138–139].

The term stabilizer in the specification and claims is intended primarily to designate ethyl linolenate and includes ordinary anti-oxidants such as propyl gallate, riboflavin, ascorbic acid, and tertiary butyl hydroquinone (TBHQ) which may be added for the same effect.

EXAMPLE 1

Animal Studies

The animal studies which are summarized in Tables I–III show that in rabbits the ethyl linoleate is effective as a topical treatment for any period post-burn and lowers the mortality in otherwise lethal burns. It is further shown that the ethyl linoleate topically enables regeneration or healing in a significant number of animals treated and to a degree significantly greater than in prior methods.

Table II in particular shows there is no statistical difference between the percent of the burned area that is healed among the treated subjects or, in other words, if treatment of the animals is immediately post-burn or at 12 hours or at 18 hours or at 24 hours, the amount of against this being due to chance are 99.0% ($X^2 = 6.50$, $P > 0.01$) certain to be less than 1 in 100.

Referring to Table III, probability of >0.001 means that one can be 99.99% certain this is not a chance event and >0.001 means that one can be 99.9% certain that this is not a chance event.

TABLE I

Healing in Control (Untreated) Burned subjects *

| | Healing | | | Deaths⁺ | | |
|---|---|---|---|---|---|---|
| No. Observed | Mean (± 1 SEM) Area ** (%) Healed at 21 Days | Healing in Excess of Mean Area | | | | |
| | | No. | % of Total Gp. | No. | % | Day (Mean ± 1 SEM) |
| 13 | 12.46 ± 4.89% | 2 | 15.39% | 4 | 30.8 | 3.25 ± 1.31 |

* Rabbits with 20%, 15 sec, 730°C contact burns
⁺ Lesion is $LA_{3i,a}$ — deaths all burn-related.
** Any healing seen in 11 subjects was by a combination of marked contracture and anterior and posterior epithelialization (edge effect). Mean healing in the remaining 2 subjects was 20% and 65% respectively.

TABLE II

Healing in Ethyl Linoleate-Treated Subjects*

| Time of Rx | No. Subjects | Mean (± 1 SEM) Area (%) Healed at 21 Days | Healing: Area Healed at 21 Days Greater in Area Than Control | | Deaths |
|---|---|---|---|---|---|
| | | | No. | % Total Group | |
| Immediate (± 1 hr. post-burn) | 6 | 57.67 ± 18.55% | 3 | 50 | 0 |
| 12 hr. post-burn | 5 | 72.50 ± 14.50% | 4 | 80 | 0 |
| 18 hr. post-burn (½ wound Rx'd: front, back, left, right only) | 25 | 66.80 ± 5.52%⁺ | 20 | 80 | 0 |
| 24 hr. post-burn | 6 | 45.00 ± 15.00% | 2 | 33.3 | 0 |
| TOTALS | 42 | 63.96 ± 5.20% | 29 | 69.04 | 0 |

*Rabbits with 20%, 15 sec., 730°C contact burns treated at the time indicated by topical application of 0.1 ml/cm² (0.8 mg/cm²) burn. Ethyl Linoleate as the only treatment.
⁺Healing in the untreated half of the wound was 20.16 ± 4.56% of the area.

TABLE III

Healing: Summary Statistical Anaylsis

| | |
|---|---|
| Controls | 2/13 healed in excess of ± 12.46% burned skin area (BSA) |
| | 4/13 died |
| | $X^2$ healing = 11.62 > P > 0.0001 |
| Treated | 29/42 healed in excess of ± 12.46% BSA |
| | 0/42 died |
| | $X^2$ death = 766.52 > P > 0.0001 |
| Healing | Mean (± 1 SEM) Area |
| | Control: 12.46 ± 4.89% |
| | Treated: 63.96 ± 5.20% |
| | t = 7.21 > P > 0.001 |

No significant difference between:
  (a) Areas healed among treated subjects
  (b) Areas healed: controls vs untreated areas in ½ Rx'd wounds healing was statistically homogenous and the statistical argument favors a separate mechanism for this aspect of ethyl linoleate treatment from that of water holding which is only valid at 12⁺ hours.

Tables II and III in particular give evidence that the lipid ethyl linoleate not only performs the function of retardation of evaporative water loss but also is associated with complete or partial re-epithelization of burn wounds (1 spray of 0.8 mg/cm² burn) and again with respect to Table II it is of significance that none of the animals treated died.

Referring again to Table II, when even half the burn is treated, no deaths were observed. Statistical odds

EXAMPLE 2

Human Studies

A 76-year-old retired surgeon was presented with radiation dermatitis of both hands which had been present for 23 years. During the pre-admission period, the patient began to notice heaped-up, violaceous excoriations on all fingers which had become progressively more extensive in terms of heaping-up and bleeding of these lesions. The patient was in constant pain and from time to time had extensive bleeding from verrucous excrescences bilaterally. Therapy over the 23-year period comprised A&D Ointment, antibacterial ointments of various sorts and Hydrocortisone cream.

Specifically verrucous excrescences were noted over the knuckle of the left ring finger (pip) and the right index finger. Numerous other similar varicosities were noted, some of them heavily keratinized, all painful and many exceedingly friable. The lesion involved the dorsum of the hands to within 2 cm of the distal ends of the radius and ulna. Therapy comprised cessation of use of creams and ointments; 3 minute warm-water soaks of the hands each night, and a sparing application of ethyl linoleate/tertiary butyl hydroquinone as noted below. After 5 days there was no further pain, little bleeding, and the patient was resting considerably better than he had in the past 23 years. During a total period of about a month, there was marked improvement in all lesions under the continued application of ethyl linoleate at a dosage level of 0.1 ml/cm$^2$ (0.8 mg/cm$^2$) of body surface where 1–2 ml/diem were utilized as a composite for both hands estimated at 135 cm$^2$.

I claim:
1. A method of treating full thickness burns on a mammal which comprises topically applying to said burns an effective burn-healing amount of ethyl-cis, cis (9,12)-octadecadienoate.
2. The method of claim 1 wherein 0.2–0.8 mg/cm$^2$ of ethyl-cis, cis (9,12)-octadecadienoate is applied topically to the burn surface.
3. The method of claim 1 wherein 0.5 mg/cm$^2$ of ethyl-cis, cis (9,12)-octadecadienoate is applied topically to the burn surface.
4. The method of claim 1 where ethyl-cis, cis (9,12)-octadecadienoate is applied neat.
5. The method of claim 1 wherein ethyl-cis, cis (9,12)-octadecadienoate is applied to burn surface immediately post-burn.

* * * * *